Patented Dec. 29, 1953

2,664,379

UNITED STATES PATENT OFFICE 2,664,379

BENTONITE SULFUR

Vincent J. Russo and John F. Les Veaux, Middleport, N. Y., assignors to Food Machinery and Chemical Corporation, San Jose, Calif., a corporation of Delaware No Drawing. Application May 16, 1950,
Serial No. 162,390

2 Claims. (Cl. 167—20)

The present invention relates to an improved colloidal fungicidal sulphur composition and more particularly to a composition of fused sulphur and bentonite clay.

It has been known for a number of years that the so-called bentonite sulphur fusion product is an excellent fungicidal composition particularly suitable for use in inhibiting the growth of fungi such as smuts, rusts and mildews and, in general, substantially all types of parasitic fungi.

Bentonite sulphur as prepared heretofore was made by fusing elemental sulphur with bentonite clay generally at temperatures above the melting point of sulphur and below about 140° C. The resultant fused product was subsequently ground and was used as a fungicide either as a dust or as a spray merely by suspending the bentonite sulphur in water. The product was an excellent fungicide on many types of fungus as, for instance, on apple scab, on brown rot occurring on stone fruits such as peaches and the like, on mildews as, for instance, the mildew occurring on grapes of the European types, as a control for smut as, for instance, wet smut and various types of spots such as cherry leaf spot.

It is believed that the effectiveness of bentonite sulphur is directly traceable to the content of colloidal sulphur present in the fused end product and, although the usual form of bentonite sulphur appearing on the market contains from about 30 to about 33% sulphur or more, the amount of colloidal sulphur present in the usual commercial type of bentonite sulphur is only a small fraction of this amount.

It is an object of the present invention to prepare a fungicidal composition of bentonite and sulphur of greater fungicidal effectiveness than has been prepared heretofore.

It is the corollary object of the invention, therefore, to prepare a bentonite sulphur composition containing a greater proportion of colloidal sulphur than was possible heretofore.

It is also an object of the invention, therefore, to render more effective as a fungicide the sulphur included in the bentonite.

The various advantages of the invention are obtained by hydrating the bentonite sulphur mixture during or after the bentonite and sulphur have been fused. It is believed that when bentonite is hydrated the individual adjacent plates or leafs which constitute the structure of bentonite are in effect pressed apart one from the other at a distance which is greater than the average atomic diameter of the sulphur whereby sulphur in extremely divided form and substantially of molecular diameter may enter and be retained between the individual adjacent leafs or plates of the bentonite itself. The sulphur in this finely divided form is then available and may be discharged from the bentonite in an active fungicidal form.

A sample of bentonite sulphur was prepared by the procedure outlined in U. S. Patent 1,550,650 of August 18, 1925, by fusing one part of sulphur by weight with two parts of bentonite. The fusion was effected at 140° C. and this temperature maintained until the mass was of substantially uniform color. The product was cooled and ground.

As this product was made in accordance with the procedure normally employed in the manufacture of commercial samples appearing upon the market it is designated herein as commercial bentonite sulphur fungicide. The content of colloidal sulphur in this sample was determined in accordance with the standard procedure recommended in the Niagara Analytical Abstracts published by Niagara Chemical Division, Food Machinery and Chemical Corporation, Middleport, New York, 5th edition, page 45; that is, a 1 gram sample is ground and thoroughly mixed with water in a 500 cc. graduate and the contents permitted to settle for 16 hours whereupon 400 cc. of the milky suspension is siphoned off, oxidized with sodium peroxide and the sulphur determined by precipitation as the sulphate.

The amount of colloidal sulphur based on the weight of bentonite sulphur was found to be 7.72%.

In accordance with the procedures of the present invention two parts by weight of —10 mesh bentonite and one part by weight of powdered sulphur were mixed and then heated at 140° C. for one hour. The product was cooled and then permitted to stand with frequent agitation in an atmosphere of 96% humidity for 124 hours at a temperature below 100° C. The moisture in the resultant product had increased to 14%. This product was again heated at 140° C. for one hour and again placed in a humid atmosphere. A determination of the colloidal sulphur showed the presence of 15.7% colloidal sulphur. A third fusion of this product, after humidification, produced a bentonite sulphur composition containing 20.4% colloidal sulphur; that is, of the total sulphur present in the product 20.4 over 33 represented the proportion of colloidal sulphur as 60%. Three and four fusions with intermittent humidification have produced products containing 26 to 27% colloidal sulphur; that is, a transformation of 88% of the total sulphur present into the colloidal condition in contrast with a transformation under the best conditions heretofore of not more than 30 to 35% of the total sulphur into the colloidal or active condition. The humidification to which the mixture is subjected between fusions, should be carried to a point where the fusion mixture possesses at least 3% moisture.

To test the effective fungicidal action of the product of the present invention various samples of bentonite sulphur were diluted in water to a concentration as specified below, either 0.125% or a concentration twice this amount, and the fungicidal suspension then sprayed under standard testing conditions upon potted Pinto beans. After the spray had dried, and in accordance with conventional test procedures, plants so treated with the fungicide were then dusted with a spore dust in standard fashion for bean rust (*Uromyces appendiculatus*). The treated plants and the controls were placed in a temperature controlled humidity chamber for a period of 24 hours and then were maintained under standard conditions side by side in the same greenhouse for a period of 10 days. The lesions on the controls, that is untreated plants, and on the treated plants were counted and the number of lesions on the treated plants subtracted from the number of lesions on the control or untreated plants divided by the number of lesions on the control plants was reported as percent control. The results of this test appear in the table below:

| Type of bentonite sulfur | Percent colloidal sulfur | Dilution of spray | Percent of control |
|---|---|---|---|
| Commercial bentonite sulfur | 7.7 | 0.125 | 48 |
|  |  | 0.25 | 69 |
| Single lab. fusion—Special particle bentonite | 14 | 0.125 | 65 |
|  |  | 0.25 | 88 |
| Instant invention—3 fusions | 20.4 | 0.125 | 88 |
|  |  | 0.25 | 98 |

An examination of the above table shows strikingly that the fungicidal activity of a bentonite sulphur composition is directly traceable to the amount of colloidal sulphur. Thus plants treated with a spray containing 0.125% of the dry fungicidal composition containing 7.72% colloidal sulphur showed 52% as many lesions as untreated plants. At the same dilution a sample of bentonite sulphur containing 14% colloidal sulphur showed 35% as many lesions as untreated plants. Again at the same dilution the sample with 20.4% colloidal sulphur showed only 12% as many lesions as the untreated plants. It will be noted that a dilution of spray of 0.25% of the sample containing 20.4% colloidal sulphur gave substantially 100% control.

Similar results will be obtained with other smuts, rusts and mildews upon which the usual bentonite sulphur has been found effective heretofore, but since the proportion of total sulphur appearing in the colloidal state is substantially greater than that which has been capable of preparation heretofore, the product of the present invention will be found more effective as a fungicide per unit weight of the composition employed in any particular fungicidal application.

The product of the present invention therefore consists of fused bentonite sulphur which, when tested according to the analytical procedure described above, will exhibit more than 14% colloidal sulphur or more than 45% of the total sulphur content as colloidal.

By the humidification process of the present invention the proportion of sulphur determined as colloidal sulphur was increased by repeated fusions and intermediate moisture take-up so that after four fusions 88% of the sulphur had been changed to the colloidal state (29% colloidal sulphur in a 2 bentonite 1 sulphur batch).

The usual commercial product will be prepared to contain a total sulphur content of 30–35% but may contain total sulphur in the range 25 to 50%, the remainder inert material and such a product is designated herein as bentonite sulphur.

What is claimed is:

1. The method of making an improved bentonite sulphur which comprises heating bentonite and sulphur at a temperature above the melting point of sulphur and below about 160° C., placing the fusion mixture in a humid atmosphere at a temperature below 100° C. until the product possesses at least 3% moisture and repeating the procedure until more than 45% of the total sulphur has been changed to the colloidal condition.

2. The method of making an improved bentonite sulphur which comprises heating bentonite and sulphur at a temperature above the melting point of sulphur and below about 160° C., placing the fusion mixture in a humid atmosphere at a temperature below 100° C. until the product possesses at least 3% moisture and repeating the procedure until 55% to 88% of the total sulphur has been changed to the colloidal condition.

VINCENT J. RUSSO.
JOHN F. LES VEAUX.

References Cited in the file of this patent
UNITED STATES PATENTS

| Number | Name | Date |
|---|---|---|
| 1,550,650 | Banks | Aug. 18, 1925 |
| 1,662,550 | Vreeland | Mar. 13, 1928 |
| 1,934,984 | McDaniel | Nov. 14, 1933 |

OTHER REFERENCES

De Ong, Journal Economic Entomology, volume 17, pages 533 to 538, October 1924. (Copy in Division 43.)